(12) United States Patent
Abels et al.

(10) Patent No.: US 6,935,803 B2
(45) Date of Patent: Aug. 30, 2005

(54) JOINT, PARTICULARLY A BALL-AND-SOCKET JOINT FOR CHASSIS PARTS IN A MOTOR VEHICLE

(75) Inventors: Olaf Abels, Belm (DE); Jens Wohlers, Lemforde (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/343,138

(22) PCT Filed: Jun. 7, 2002

(86) PCT No.: PCT/DE02/02075

§ 371 (c)(1),
(2), (4) Date: Jan. 28, 2003

(87) PCT Pub. No.: WO02/101250

PCT Pub. Date: Dec. 19, 2002

(65) Prior Publication Data

US 2003/0175068 A1 Sep. 18, 2003

(30) Foreign Application Priority Data

Jun. 11, 2001 (DE) .......................... 101 27 881

(51) Int. Cl.$^7$ .............................. F16B 7/10; F16J 15/52
(52) U.S. Cl. ........................... 403/50; 403/51; 403/115; 403/122; 277/634; 277/635
(58) Field of Search .............................. 403/50, 51, 56, 403/76, 90, 114, 115, 122; 277/634–636

(56) References Cited

U.S. PATENT DOCUMENTS

| 2,197,037 A | * | 4/1940 | Gardner | 277/635 |
| 2,397,464 A | * | 4/1946 | Booth | 403/134 |
| 3,021,157 A | | 2/1962 | Moskovitz | |
| 3,357,728 A | * | 12/1967 | Melton et al. | 277/635 |
| 3,842,621 A | * | 10/1974 | Mazziotti | 277/635 |
| 5,100,254 A | | 3/1992 | Wasada | |
| 5,498,092 A | * | 3/1996 | Fellows | 403/51 |
| 5,538,275 A | * | 7/1996 | Lomnick | 277/635 |
| 6,579,187 B2 | * | 6/2003 | Ramey | 403/51 |

FOREIGN PATENT DOCUMENTS

| EP | 0 570 736 | 11/1993 |
| GB | 892025 | 3/1962 |

* cited by examiner

Primary Examiner—Daniel P. Stodola
Assistant Examiner—Victor MacArthur
(74) Attorney, Agent, or Firm—McGlew and Tuttle, P.C.

(57) ABSTRACT

A joint (1) with a joint housing (2) and with a joint shell (3) is arranged therein with a ball (4) having a pivot pin (5) protruding from the joint housing (2) and surrounded by a rubber bellows (6) with a protective cap (7). A ring (8) for holding the protective cap (7) is connected to the edge area (6a) of the rubber bellows (6). The edge area (6a) concentrically surrounds the pivot pin (5). The ring (8) has a circular bead (8b, 8c) on its annular outer side (8a) and is vulcanized into the edge area (6a) of the rubber bellows (6). The protective cap (7) is provided on its inner side (7a) with a plurality of projections (9), which can be bent from the outside through openings (10) in the protective cap (7) by means of a tool (11) radially (arrow 12) in relation to the pivot pin (5) against the bead (8b, 8c) of the ring (8) in a non-positive and positive locking manner.

4 Claims, 5 Drawing Sheets

JOINT, PARTICULARLY A BALL-AND-SOCKET JOINT FOR CHASSIS PARTS IN A MOTOR VEHICLE

FIELD OF THE INVENTION

The present invention pertains to a joint, especially a ball-and-socket joint for chassis parts in a motor vehicle, with a joint housing and a joint shell arranged therein with a ball, whose pivot pin protrudes from the joint housing and is surrounded by a rubber bellows with a protective cap, wherein a ring for holding the protective cap is connected to the edge area of the rubber bellows, which said edge area concentrically surrounds the pivot pin.

BACKGROUND OF THE INVENTION

A prior-art joint of this type according to U.S. Pat. No. 5,100,254 has, among other things, a rubber bellows with a metal ring of a U-shaped cross section, which is connected thereto and in the U-shaped recess of which the lip of a protective cap consisting of plastic is clipped. Since the protective cap must be pushed against the rubber bellows downwardly in the direction of the longitudinal direction to clip this lip into the ring of the rubber bellows, the rubber bellows is inevitably subject to an undesired deformation, because an opposing pressing force with a counterpressure element is absent. Consequently, the protective cap with the compressed rubber bellows must be inevitably pulled in the opposite direction after the clipping, which may in turn lead to the release of the protective cap from the ring. At any rate, it is disadvantageous in the different embodiments according to this document that the protective cap must always be pressed in the direction of the longitudinal axis towards the ball against the rubber bellows for connection with the ring. An undesired deformation of the rubber bellows is inevitable as a consequence of these axial forces.

A joint of a different type, which is surrounded by a protective cap fastened to the joint housing of the ball-and-socket joint, has become known from EP 0 570 736 A1. This protective cap is held in a recess extending circularly around the joint housing by means of a retaining ring. Even though this construction advantageously shields the rubber bellows against lateral thermal effects like a heat shield, the penetration of particles from the pivot side toward the rubber bellows cannot be prevented, because the necessary angular deflection of the ball pivot inevitably determines the size of the non-shielded intermediate space between it and the inner side of the protective cap. In addition, this construction requires two different fastenings, namely, for the rubber bellows, on the one hand, and for the protective shield, on the other hand.

Such heat insulation means are always needed whenever ball-and-socket joints are arranged in the vicinity of heat sources, e.g., disk brakes, without sufficient protection being provided for cooling or without other heat-insulating measures being able to be taken. Protective caps made of sheet metal have been known in this connection, which are arranged either at the steering knuckle, at the joint housing of the ball pivot or at the suspension arm. They are mounted in the course of the mounting of the axle or the mounting of the individual components. The drawback of all these solutions is based especially on their complicated and error-prone mounting or, in the case of the solutions with arrangement at the joint housing, on the strong effect of the movements of the joint on the possible enclosing angle of the sheet metal around the sealing bellows. Joints with a large angular deflection can therefore be protected only insufficiently with the solution according to EP 0 570 736 A1.

Protective caps made of plastic or rubber materials can withstand only substantially lower peak temperatures than metal or, in the case of rubber material, they may even be deformed by the relative wind of the vehicle and/or be subject to fluttering movements.

By contrast, caps made, of metal or plastic, which are pressed on the pivot pin, must be oriented during mounting in the vehicle and are associated with the risk of becoming separated due to the short length over which they are pressed on.

To illustrate these problems, reference is made to the work of Prof. Jörnsen Reimpell, Cert. Eng., entitled "Chassis Engineering: Wheel Suspensions," 2nd edition; 1988, pp. 132 and 304, in which joints with protective caps are shown on the front axle side of a motor vehicle.

SUMMARY OF THE INVENTION

Based on this state of the art, the basic object of the present invention is to improve a joint of the type mentioned in the introduction such that while offering protection for the rubber bellows over a large area, it can be manufactured and mounted in a simple manner, without exposing the rubber bellows to appreciable axial forces.

This object is accomplished in conjunction with the generic term mentioned in the introduction, according to a first embodiment, by the ring having at least one bead on its annular outer side and by being vulcanized into the edge area of the rubber bellows, and by the protective cap being provided on its inner side with a plurality of projections, which can be bent through openings in the protective cap in the outward direction against the bead of the ring in a non-positive and positive-locking manner. Thus, the deformation mentioned can be brought about, e.g., by means of a tool radially or centripetally in relation to the pivot pin. For example, a screw driver would have to be passed for this purpose through the opening in the protective cap and the projection would-have to be bent radially against the bead of the ring in order to guarantee the reliable and firm seating of the protective cap on the ring vulcanized into the rubber bellows. Thus, the projections become dug into the ring incorporated by vulcanization.

The ring advantageously has a plurality of beads and, e.g., also beads extending over the entire periphery in the cross section, so that it forms a wave shape, whereas the protective cap completely surrounding the rubber bellows is provided with T-shaped notches, of which at least one web is bent off toward the inner side of the protective cap and forms a projection. As a result, the notch also forms an opening for passing through a tool, e.g., a screw driver, in order to dig the projection into the ring of the rubber bellows by bending.

According to a second embodiment, the basic object of the present invention is accomplished in conjunction with the generic structure mentioned in the introduction by the ring being vulcanized into the edge area of the rubber bellows and having a plurality of projections on its side facing away from the ball-and-socket joint, which said projections pass through the openings prepared in advance with identical cross-sectional configuration in the protective cap and connect the ring to the protective cap after passing through by a mechanical or thermal deformation. In this embodiment, the protective cap with its openings is slipped over the projections of the vulcanized ring of the rubber bellows and these projections are then either bent over radially by means of a suitable tool or, if the projections consist of a plastic, they are provided with a broader head by a moderate and short-term heating, e.g., by thermal melting, and the protective cap is thus inseparably connected to the rubber bellows. The protective cap surrounds the rubber bellows without interruptions according to this solution because the openings according to the first solution are not necessary for passing through a tool.

According to an advantageous variant of the present invention, the projections of the ring are formed by teeth of equal size, which are arranged at equally spaced locations and pass through a corresponding hole pattern of the protective cap when the latter is put on. Appreciable axial forces cannot be encountered in this case, either, and radial forces are also unnecessary during the melting of projections consisting of, e.g., a plastic.

The rings advantageously consist of a metal or plastic such as PA 66. The ring provided with a bead advantageously consists of hardened carbon steel.

The ring provided with the projections in the rubber bellows is made either of metal or a plastic with high heat resistance, e.g., PA 66, PTFE or PEEK. The protective cap should keep both thermal and mechanical effects away from the rubber bellows and should therefore be made of special steel, hot-galvanized steel plate or a glass fiber-reinforced plastic.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a diametric sectional view through the rubber bellows with the ring vulcanized in;

DESCRIPTION OF THE PREFERRED EMBODIMENTS

Figure 1A:
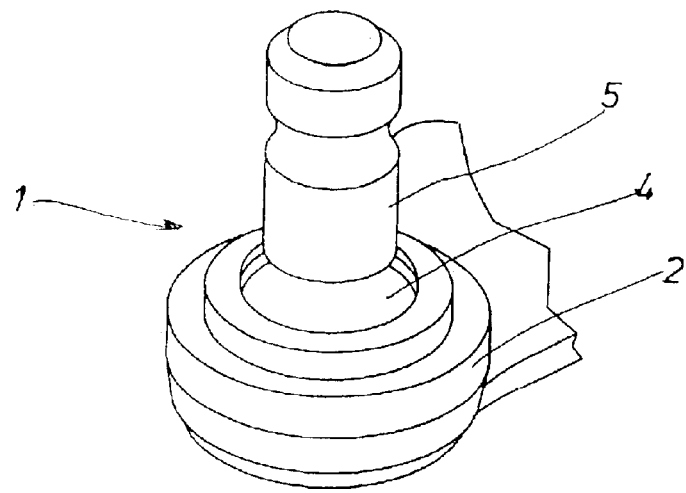
FIG. 1a is the perspective view of a ball-and-socket joint without rubber bellows and protective cap showing an individual phase of the first solution for connecting a protective cap to a rubber bellows.

Referring to the drawings in particular, In FIGS. 1 through 6, identical parts are always designated by the same reference numbers. The ball-and-socket joint 1 according to FIG. 1 intended for being arranged between chassis parts in a motor vehicle is provided with a joint housing 2 and a joint shell 3, arranged therein. The joint shell 3 surrounds the ball 4 over a large area, the pivot pin 5 of the said ball 4 protruding from the joint housing 2.

Figure 2:
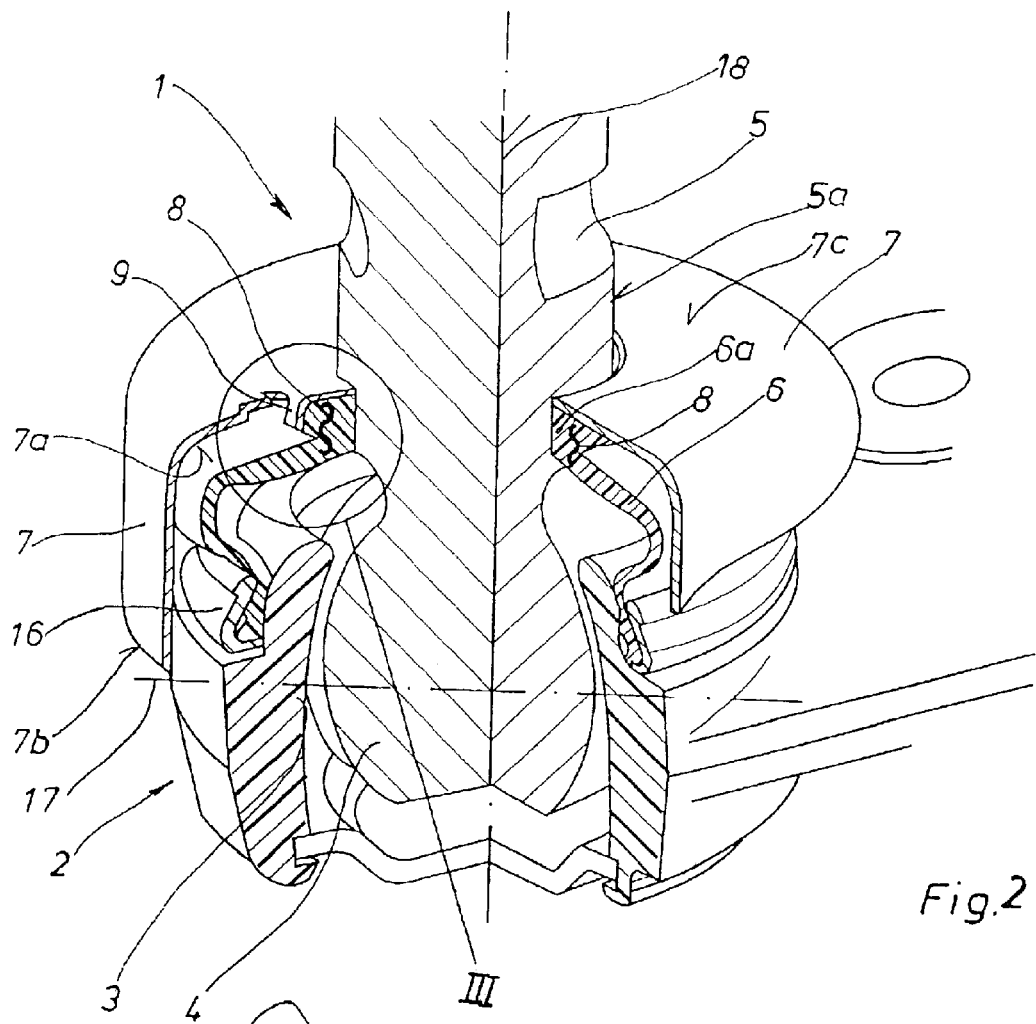
FIG. 2 is a perspective sectional view in the direction of arrows II—II in FIG. 1c in an enlarged view compared with FIG. 1c.

According to FIG. 2, this pivot pin 5 is surrounded by a rubber bellows 6 with a protective cap 7, and a ring 8 for holding the protective cap 7 is vulcanized into the edge area 6a of the rubber bellows 6, which edge area concentrically surrounds the pivot pin 5. This ring 8 has at least one circular bead 8b, 8c on its annular outer side 8a (see FIG. 6).

The protective cap 7 is provided on its inner side 7a with a plurality of projections 9, only one of which is shown in FIG. 2.

Figure 3:
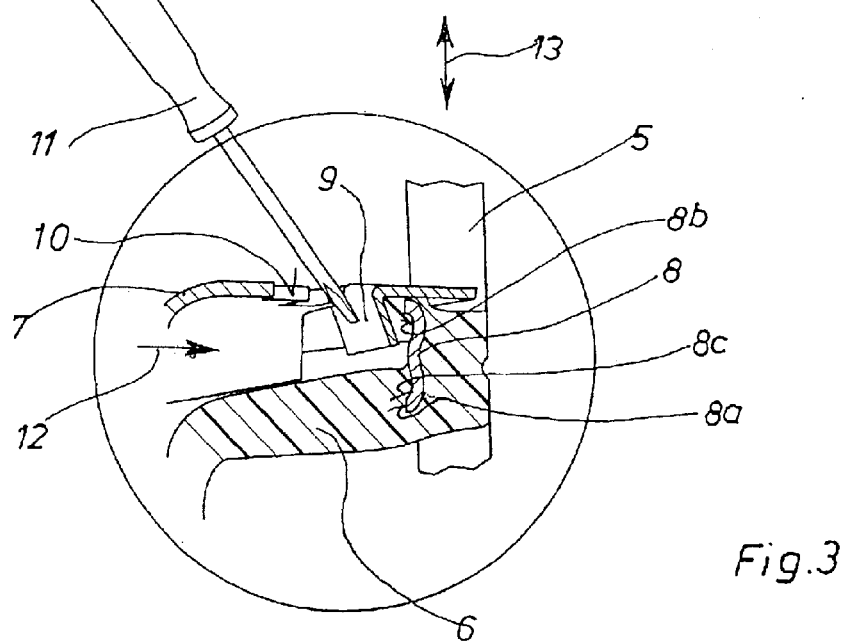
FIG. 3 is an enlarged detail view III from FIG. 2.

According to FIG. 3, this projection 9 can be bent by means of a tool 11, e.g., with a screw driver in the case being shown, radially in the direction of arrow 12 against the pivot pin 5 and thus in a non-positive and positive-locking manner against the bead 8b or 8c of the ring S. As a result, this projection is dug into the material of the rubber bellows 6 surrounding the bead 8b and 8c, in which material the ring 8 is vulcanized. As a result, the protective cap 7 is seated immovably on the rubber bellows 6, without axial forces having to be applied to the latter 6 in the direction of the double arrow 13. Since the protective cap 7 is now fixed in an oriented manner on the rubber bellows 6, on the one hand, and on the pivot pin 5 on the other hand, it can follow the particular desired and/or necessary angular deflection together with the rubber bellows 6, without any force being applied on the ball-and-socket joint 1 whatsoever.

In the case being shown, the ring 8 has a wave-shaped cross section. As a result, a plurality of beads 8b and 8c are formed on its outer side, so that the projections 9 can engage one bead or the other, 8b or 8c, as desired, and can dig into the rubber material of the rubber bellows 6 located in front of them.

The projections 9 may have any desired shape x and are formed in the case being shown by the web of T-shaped notches 10, whose web is bent off toward the inner side 7a of the protective cap 7 and thus forms the projection 9.

Figure 4:
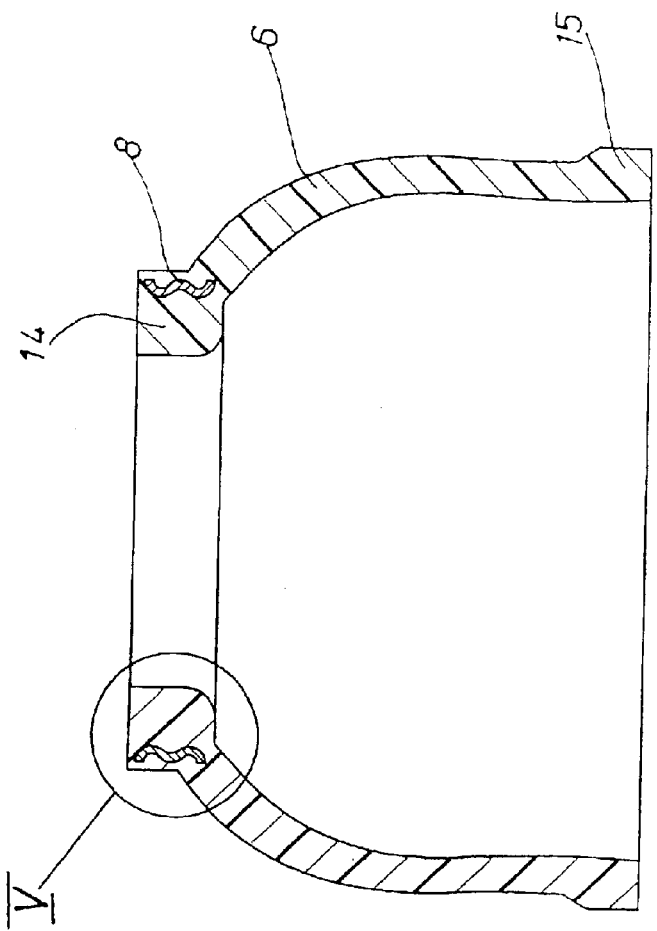
Figure 5:
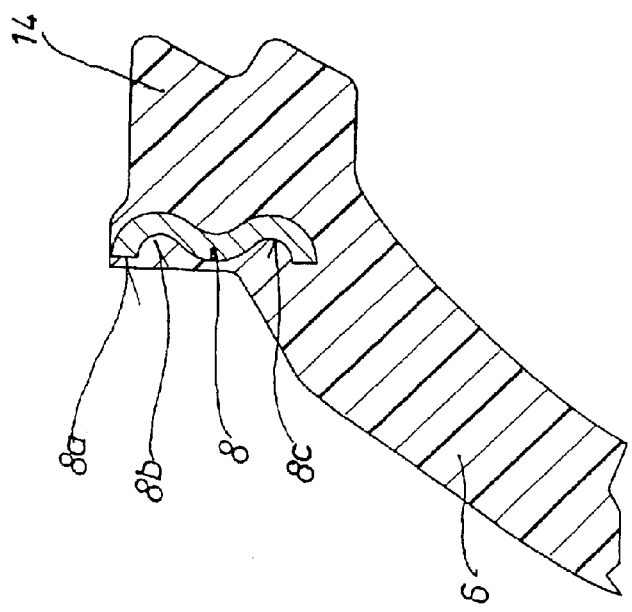
FIG. 5 is an enlarged detail view V from FIG. 4.
Figure 6:
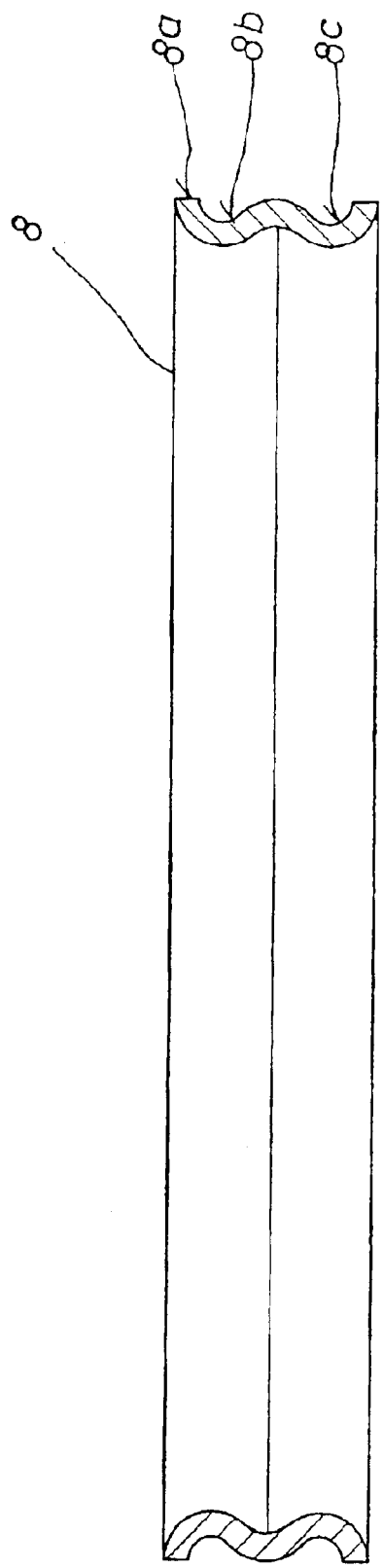
FIG. 6 is the diametric sectional view of the ring vulcanized into the rubber bellows.
Figure 7A:
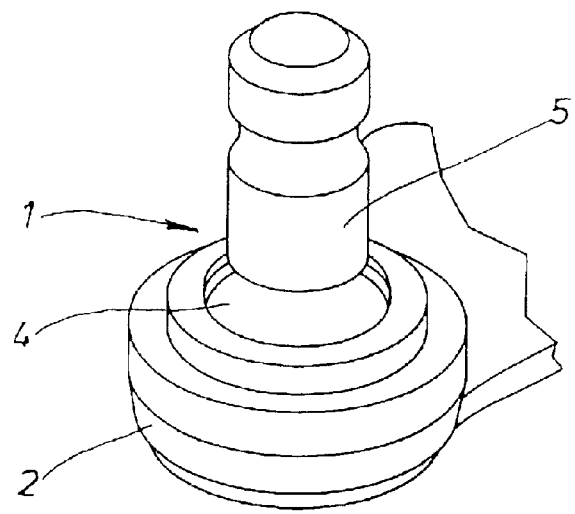
FIG. 7a is a perspective view of a ball-and-socket joint without the rubber bellows and without protective cap showing an individual phase of a second embodiment for connecting a rubber bellows to a protective cap.
Figure 7B:
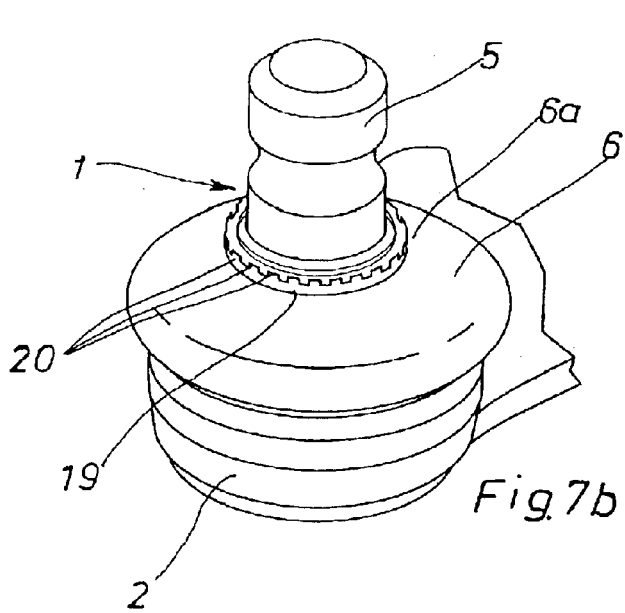
FIG. 7b is a perspective view as in FIG. 7a with a rubber bellows attached with a ring vulcanized in with axially projecting teeth showing another individual phase of a second embodiment for connecting a rubber bellows to a protective cap.

The position of the ring 8 vulcanized into the rubber bellows 6 can be clearly recognized from FIGS. 4 and 5. The rubber bellows 6 is in contact with a ring 14 and the annular inner projections thereof with the outer circumference 5a of the pivot pin 5 in a frictionally engaged manner (see FIG. 5). At its opposite end, the rubber bellows 6 is provided with an outer ring 15 (see FIG. 4), which is held in a positive-locking manner on an enclosing ring 16, which is in turn fixed to the joint housing 2, as can be seen in FIG. 2.

Figure 1B:
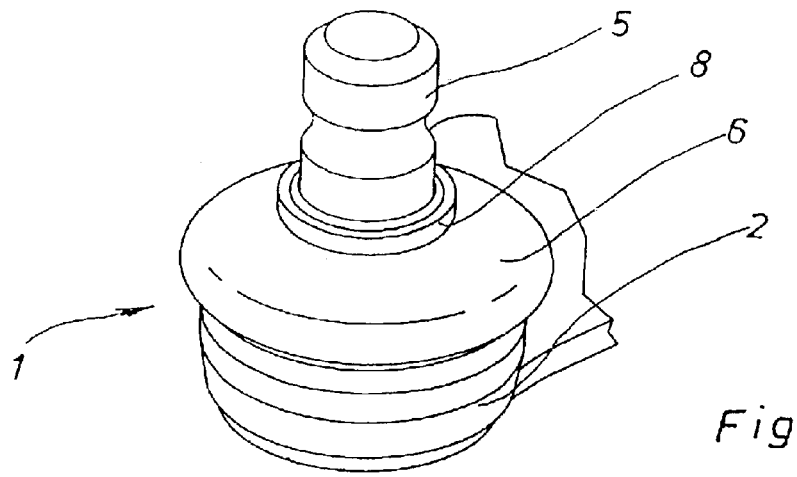
FIG. 1b is a perspective view as in FIG. 1a with a rubber bellows pushed over the pivot pin with the ring vulcanized in showing another individual phase of the first solution for connecting a protective cap to a rubber bellows.
Figure 1C:
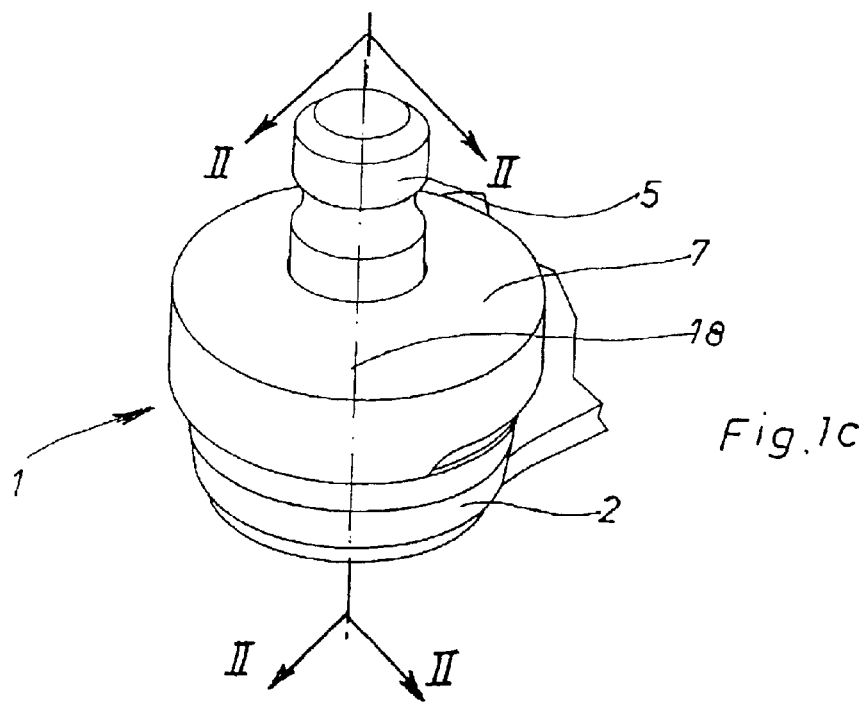
FIG. 1c is a perspective view as in FIG. 1b with a protective cap connected to the rubber bellows showing another individual phase of the first solution for connecting a protective cap to a rubber bellows.

As can be clearly recognized from FIGS. 1 through 3, this solution guarantees a vehicle-oriented connection of the rubber bellows 6 to the protective cap 7, which completely protects the rubber bellows 6 against both the effect of heat and wind movements and stone chips. Reference is made for this purpose to the left-hand half of FIG. 2, because the right-hand half of the figure shows a cut-away view in the lower area to expose the enclosing ring 16 of the protective cap 7. As a result, the protective cap 7 with its lower edge area 7b can be moved up to the meridian plane 17 of the ball-and-socket joint 1. The longitudinal symmetry axis of the pivot pin 5 is designated by 18.

The second embodiment of the present invention is shown in FIGS. 7a through 9. Parts that are identical to those in FIGS. 1 through 6 are designated by the same reference numbers. In this embodiment, the ring 19 vulcanized into the edge area 6a of the rubber bellows 6 has a plurality of projections 20 on its side facing away from the ball-and-socket joint 1, and the said projections 20 pass through the openings 21 of identical cross-sectional configuration of the protective cap 7, which were prepared in advance, and after passing through, they connect the ring 19 and consequently the rubber bellows 6 to the protective cap 7 either by mechanical or thermal deformation.

Figure 8:
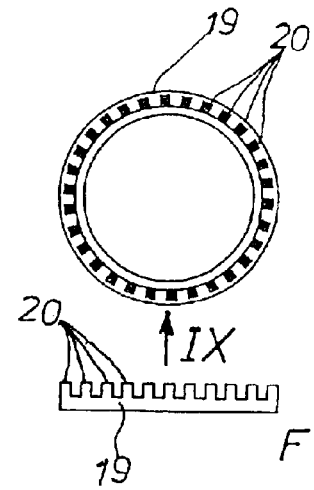
FIG. 8 is a top view of the ring from FIG. 7b.
Figure 9:
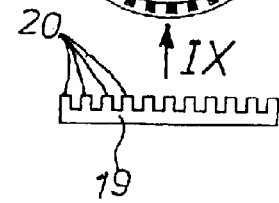
FIG. 9 is a side view of the ring in the direction of arrow IX in FIG. 8.
Figure 7C:
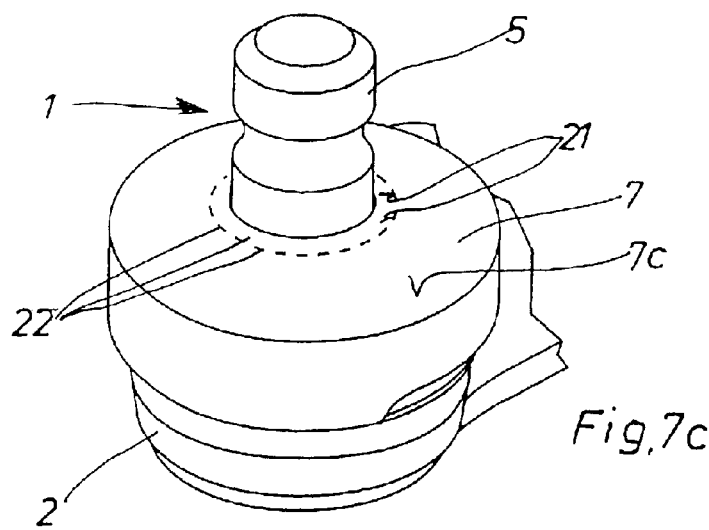
FIG. 7c is a perspective view as in FIG. 7b after the protective cap has been put on and after the thermoplastic deformation of the previously projecting teeth showing another individual phase of a second embodiment for connecting a rubber bellows to a protective cap.

As can be determined especially from FIGS. 8 and 9, the projections 20 of the ring 19 are formed by teeth, which are of equal size, are located at equally spaced locations and engage a corresponding hole pattern 22 of the protective cap 7 when the protective cap is put on. Two different embodiments are possible here:

According to a first embodiment, the ring 19 may consist of metal and be provided with only a few projections 20, which do, however, extend through the openings 21 of the protective cap 7 over a certain length, and these projections can be bent over in one of the two possible directions of deformation, e.g., by means of nippers after the protective cap 7 has been placed on the rubber bellows 6 and as a result, they connect the protective cap 7 to the rubber bellows 6 in a positive-locking manner.

According to a second embodiment, the ring 19 may be made, as can be seen, of an injection-molded plastic part and vulcanized into the rubber bellows 6. After the protective cap 7 has been put on with a hole pattern 22 corresponding to the pattern of the projecting teeth 20, the ends of the teeth 20 protruding over the surface 7c of the protective cap 7 are melted off by a brief and locally limited heating, e.g., by means of a resistance wire or induction wire to form a material head extending over the hole pattern 22, and the protective cap 7 is firmly connected to the rubber bellows 6 as a result. This solution is associated with the advantage of a complete protective cap 7 having no perforations 10 (see FIG. 3). Since the protective cap 7 is connected to the rubber bellows 6 in a vehicle-oriented manner in this case as well, this solution has, moreover, the same advantages as the first embodiment alternative according to FIGS. 1 through 6.

The rings 8 and 19 may be made of steel or plastic, e.g., PA 66. However, it is also possible to manufacture the ring 8 provided with the beads 8b and 8c from hardened carbon steel.

The ring 19 provided with the projections 20 according to the second embodiment shown in FIGS. 7a through 9 consists either of metal, e.g., for the mechanical deformation of the projections 20, or of a plastic with high heat resistance, such as PA 66, PTFE or PEEK, in order to melt off the teeth 20 extending through the protective cap 7 in the hole pattern 22 by a brief heating to make them into a rivet head.

The protective cap 7 advantageously consists of a special steel, hot-galvanized steel plate or a glass fiber-reinforced plastic in order to protect the rubber bellows 6 from both thermal effects and mechanical forces.

While specific embodiments of the invention have been shown and described in detail to illustrate the application of the principles of the invention, it will be understood that the invention may be embodied otherwise without departing from such principles.

What is claimed is:

1. A ball-and-socket joint for chassis parts in a motor vehicle, comprising:
   a joint housing;
   a joint shell arranged in said housing;
   a ball with a pivot pin protruding from said joint housing
   a rubber bellows, said pivot pin being surrounded by said rubber bellows;
   a protective cap; and
   a ring for holding the protective cap, said ring being connected to an edge area of said rubber bellows that concentrically surrounds said pivot pin, said ring having an annular outer side having at least one bead and being vulcanized into said edge area of said rubber bellows, said protective cap having an inner side with a plurality of projections, said projections being bent by a tool having access through openings in said protective cap from an outside against said bead in a positive-locking manner to connect said cap to said ring and said bellows, wherein said protective cap completely surrounding said rubber bellows is provided with T-shaped notches of which at least one web is bent off toward an inner side of said protective cap to form one of said protections.

2. A joint in accordance with claim 1, wherein said projections can be bent through said openings in said protective cap from the outside, by means of said tool, centripetally or radially in relation to said pivot pin.

3. A joint in accordance with claim 1, wherein said ring has a wave-shaped cross section.

4. A ball-and-socket joint for chassis pats in a motor vehicle, comprising:
   a joint housing;
   a joint shell arranged in said housing;
   a ball with a pivot pin protruding from said joint housing
   a rubber bellows;
   a protective cap, said pivot pin being surrounded by said rubber bellows;
   a ring for holding the protective cap, said ring being connected to an edge area of said rubber bellows that concentrically surrounds said pivot pin, said ring having an annular outer side having at least one bead and being vulcanized into said edge area of said rubber bellows, said protective cap having an inner side with a plurality of projections, said projections being bent by a tool having access through openings in said protective cap from an outside against a bead of said ring with said projections dug into the ring at the edge area of the bellows to connect the protective cap to the bellows in a positive-locking manner.

* * * * *